(12) United States Patent
Connor et al.

(10) Patent No.: US 11,558,125 B2
(45) Date of Patent: Jan. 17, 2023

(54) HYBRID OPTICAL/ACOUSTIC WIRELESS COMMUNICATIONS NETWORK

(71) Applicants: ThayerMahan, Inc., Groton, CT (US); Woods Hole Oceanographic Institution, Woods Hole, MA (US)

(72) Inventors: Michael Joseph Connor, Mystic, CT (US); Norman Farr, Monument Beach, MA (US)

(73) Assignees: THAYERMAHAN, INC., Groton, CT (US); WOODS HOLE OCEANOGRAPHIC INSTITUTION, Woods Hole, MA (US)

(*) Notice: Subject to any disclaimer, the term of this patent is extended or adjusted under 35 U.S.C. 154(b) by 57 days.

(21) Appl. No.: 17/145,097

(22) Filed: Jan. 8, 2021

(65) Prior Publication Data

US 2021/0218480 A1 Jul. 15, 2021

Related U.S. Application Data

(60) Provisional application No. 62/959,504, filed on Jan. 10, 2020.

(51) Int. Cl.
*H04B 13/02* (2006.01)
*H04B 10/29* (2013.01)
*H04B 11/00* (2006.01)

(52) U.S. Cl.
CPC ............ *H04B 13/02* (2013.01); *H04B 10/29* (2013.01); *H04B 11/00* (2013.01)

(58) Field of Classification Search
CPC ..................................................... H04B 13/02
See application file for complete search history.

(56) References Cited

U.S. PATENT DOCUMENTS

| | | |
|---|---|---|
| 4,065,747 A | 12/1977 | Patten et al. |
| 4,805,160 A | 2/1989 | Ishii et al. |
| 6,859,419 B1 * | 2/2005 | Blackmon ............. H04B 11/00 367/134 |
| 8,233,801 B2 | 7/2012 | Sexton et al. |
| 8,818,273 B2 | 8/2014 | Jung et al. |
| 10,256,918 B2 | 4/2019 | Harris et al. |
| 2004/0047235 A1 * | 3/2004 | Kyle ....................... E21B 47/14 340/854.4 |
| 2008/0219093 A1 * | 9/2008 | Heatley ................... G01V 1/16 367/16 |
| 2020/0059365 A1 | 2/2020 | Hyland |

* cited by examiner

*Primary Examiner* — Hsinchun Liao
(74) *Attorney, Agent, or Firm* — Wilson Sonsini Goodrich & Rosati (57) ABSTRACT

Provided herein are hybrid optical/acoustic wireless communications platforms for aquatic environments, the platforms comprising: an optical communications system configured to send and receive optical communications signals along a bed of the aquatic environment; an optical/acoustic communications signal converter; and an acoustic communications system configured to send and receive acoustic communications signals between the bed of the aquatic environment and a surface of the aquatic environment.

43 Claims, 2 Drawing Sheets

HYBRID OPTICAL/ACOUSTIC WIRELESS COMMUNICATIONS NETWORK

CROSS-REFERENCE TO RELATED APPLICATIONS

This application claims the priority and benefit of U.S. Provisional Application No. 62/959,504, filed Jan. 10, 2020, entitled "HYBRID OPTICAL/ACOUSTIC WIRELESS COMMUNICATIONS NETWORK," the contents of which is incorporated herein by reference in its entirety.

BACKGROUND

Aquatic construction and production operations frequently implement machinery at the surface, on the bed, and/or within the water column of the aquatic environment, as well as sensors distributed throughout the aquatic environment. In many cases, the sensors are installed after the machinery.

SUMMARY

The safety and efficiency of aquatic construction and production operations, such as offshore oil and gas production, could be enhanced if seabed components were linked to each other and to the surface via wireless technology. This has been a challenge to date. The most common form of wireless undersea communication, the acoustic modem, performs poorly in the high noise environment that surrounds oil and gas production infrastructure. Acoustic noise zones are formed within aquatic environments when acoustic noise from machinery propagates radially from its source or sources extending out to an acoustic noise distance from the machinery. The second most common form of wireless underwater communication, the optical modem, lacks the range to reach the surface from the seabed under most conditions. In addition, optical modems are degraded near the ocean surface by organic matter that scatters the light and by sunlight that competes with the modem signal at the point of the receiver. Optical noise zones are formed within aquatic environments by this organic material and ambient sunlight. That said, the ocean environment at deep depths has no ambient light and very little biologic material.

In various embodiments, described herein are communications networks that leverage the strengths of optical and acoustic communications while mitigating their vulnerabilities. Provided herein, in some embodiments, are network topologies that utilize optical communications to move data horizontally between sensors and actuators near production equipment to a vertical/horizontal communications relay node at deep depth to clear ambient noise field in the immediate vicinity of the production equipment. The vertical/horizontal communications relay node then communicates vertically to near surface assets via acoustic means. Near the surface, one or more deep tow sea surface communications relay nodes enable a surface node to stand off from sea surface and water column (e.g., riser pipes) production assets and mitigate the effects of the anthropogenic (man-made) and naturally occurring surface generated noise.

Accordingly, one aspect provided herein is a hybrid optical/acoustic wireless communications platform for an aquatic environment, the platform comprising: an optical communications system configured to send and receive optical communications signals along a bed of the aquatic environment; an optical/acoustic communications signal converter; and an acoustic communications system configured to send and receive acoustic communications signals between the bed of the aquatic environment and a surface of the aquatic environment.

In some embodiments, the aquatic environment is a marine environment. In some embodiments, the bed of the marine environment is a deep seabed. In some embodiments, the optical communications signals comprise laser. In some embodiments, the acoustic communications system comprises a buoy at the surface of the aquatic environment. In some embodiments, the acoustic communications system comprises a vehicle at the surface of the aquatic environment. In some embodiments, the vehicle is an unmanned vehicle. In some embodiments, the unmanned vehicle is unmoored and untethered. In some embodiments, the vehicle at the surface of the aquatic environment transmits/receives a surface signal. In some embodiments, the optical/acoustic communications signal converter is positioned at the bed of the aquatic environment. In some embodiments, the optical/acoustic communications signal converter is configured to: a) receive optical communications signals from the optical communications system and transmit corresponding acoustic communications signals to the acoustic communications system; and b) receive acoustic communications signals from the acoustic communications system and transmit corresponding optical communications signals to the optical communications system. In some embodiments, the optical/acoustic communications signal converter receives communications signals at a first data rate and transmits communications signals at a second data rate that is less than the first data rate. In some embodiments, the optical communications system comprises one or more optical repeaters.

In some embodiments, the one or more optical repeaters are separated from each other by about 100 m to about 600 m, including increments therein. In some embodiments, the one or more optical repeaters are separated from each other by about 100 m to about 150 m, about 100 m to about 200 m, about 100 m to about 250 m, about 100 m to about 300 m, about 100 m to about 350 m, about 100 m to about 400 m, about 100 m to about 450 m, about 100 m to about 500 m, about 100 m to about 550 m, about 100 m to about 600 m, about 150 m to about 200 m, about 150 m to about 250 m, about 150 m to about 300 m, about 150 m to about 350 m, about 150 m to about 400 m, about 150 m to about 450 m, about 150 m to about 500 m, about 150 m to about 550 m, about 150 m to about 600 m, about 200 m to about 250 m, about 200 m to about 300 m, about 200 m to about 350 m, about 200 m to about 400 m, about 200 m to about 450 m, about 200 m to about 500 m, about 200 m to about 550 m, about 200 m to about 600 m, about 250 m to about 300 m, about 250 m to about 350 m, about 250 m to about 400 m, about 250 m to about 450 m, about 250 m to about 500 m, about 250 m to about 550 m, about 250 m to about 600 m, about 300 m to about 350 m, about 300 m to about 400 m, about 300 m to about 450 m, about 300 m to about 500 m, about 300 m to about 550 m, about 300 m to about 600 m, about 350 m to about 400 m, about 350 m to about 450 m, about 350 m to about 500 m, about 350 m to about 550 m, about 350 m to about 600 m, about 400 m to about 450 m, about 400 m to about 500 m, about 400 m to about 550 m, about 400 m to about 600 m, about 450 m to about 500 m, about 450 m to about 550 m, about 450 m to about 600 m, about 500 m to about 550 m, about 500 m to about 600 m, or about 550 m to about 600 m, including increments therein. In some embodiments, the one or more optical repeaters are separated from each other by about 100 m, about 150 m, about 200 m, about 250 m, about 300 m, about 350 m, about 400 m, about 450 m, about 500 m, about 550 m, or about 600 m, including increments therein. In some embodiments, the one or more optical repeaters are separated from each other by at least about 100 m, about 150 m, about 200 m, about 250 m, about 300 m, about 350 m, about 400 m, about 450 m, about 500 m, or about 550 m, including increments therein. In some embodiments, the one or more optical repeaters are separated from each other by at most about 150 m, about 200 m, about 250 m, about 300 m, about 350 m, about 400 m, about 450 m, about 500 m, about 550 m, or about 600 m, including increments therein.

In some embodiments, the optical repeater has a range of about 100 m to about 600 m, including increments therein. In some embodiments, the optical repeater has a range of about 100 m to about 150 m, about 100 m to about 200 m, about 100 m to about 250 m, about 100 m to about 300 m, about 100 m to about 350 m, about 100 m to about 400 m, about 100 m to about 450 m, about 100 m to about 500 m, about 100 m to about 550 m, about 100 m to about 600 m, about 150 m to about 200 m, about 150 m to about 250 m, about 150 m to about 300 m, about 150 m to about 350 m, about 150 m to about 400 m, about 150 m to about 450 m, about 150 m to about 500 m, about 150 m to about 550 m, about 150 m to about 600 m, about 200 m to about 250 m, about 200 m to about 300 m, about 200 m to about 350 m, about 200 m to about 400 m, about 200 m to about 450 m, about 200 m to about 500 m, about 200 m to about 550 m, about 200 m to about 600 m, about 250 m to about 300 m, about 250 m to about 350 m, about 250 m to about 400 m, about 250 m to about 450 m, about 250 m to about 500 m, about 250 m to about 550 m, about 250 m to about 600 m, about 300 m to about 350 m, about 300 m to about 400 m, about 300 m to about 450 m, about 300 m to about 500 m, about 300 m to about 550 m, about 300 m to about 600 m, about 350 m to about 400 m, about 350 m to about 450 m, about 350 m to about 500 m, about 350 m to about 550 m, about 350 m to about 600 m, about 400 m to about 450 m, about 400 m to about 500 m, about 400 m to about 550 m, about 400 m to about 600 m, about 450 m to about 500 m, about 450 m to about 550 m, about 450 m to about 600 m, about 500 m to about 550 m, about 500 m to about 600 m, or about 550 m to about 600 m, including increments therein. In some embodiments, the optical repeater has a range of about 100 m, about 150 m, about 200 m, about 250 m, about 300 m, about 350 m, about 400 m, about 450 m, about 500 m, about 550 m, or about 600 m, including increments therein. In some embodiments, the optical repeater has a range of at least about 100 m, about 150 m, about 200 m, about 250 m, about 300 m, about 350 m, about 400 m, about 450 m, about 500 m, or about 550 m, including increments therein. In some embodiments, the optical repeater has a range of at most about 150 m, about 200 m, about 250 m, about 300 m, about 350 m, about 400 m, about 450 m, about 500 m, about 550 m, or about 600 m, including increments therein.

In some embodiments, the acoustic communications signals have a frequency of about 1 kHz to about 50 kHz, including increments therein. In some embodiments, the acoustic communications signals have a frequency of about 1 kHz to about 2 kHz, about 1 kHz to about 5 kHz, about 1 kHz to about 10 kHz, about 1 kHz to about 15 kHz, about 1 kHz to about 20 kHz, about 1 kHz to about 25 kHz, about 1 kHz to about 30 kHz, about 1 kHz to about 35 kHz, about 1 kHz to about 40 kHz, about 1 kHz to about 45 kHz, about 1 kHz to about 50 kHz, about 2 kHz to about 5 kHz, about 2 kHz to about 10 kHz, about 2 kHz to about 15 kHz, about 2 kHz to about 20 kHz, about 2 kHz to about 25 kHz, about 2 kHz to about 30 kHz, about 2 kHz to about 35 kHz, about 2 kHz to about 40 kHz, about 2 kHz to about 45 kHz, about 2 kHz to about 50 kHz, about 5 kHz to about 10 kHz, about 5 kHz to about 15 kHz, about 5 kHz to about 20 kHz, about 5 kHz to about 25 kHz, about 5 kHz to about 30 kHz, about 5 kHz to about 35 kHz, about 5 kHz to about 40 kHz, about 5 kHz to about 45 kHz, about 5 kHz to about 50 kHz, about 10 kHz to about 15 kHz, about 10 kHz to about 20 kHz, about 10 kHz to about 25 kHz, about 10 kHz to about 30 kHz, about 10 kHz to about 35 kHz, about 10 kHz to about 40 kHz, about 10 kHz to about 45 kHz, about 10 kHz to about 50 kHz, about 15 kHz to about 20 kHz, about 15 kHz to about 25 kHz, about 15 kHz to about 30 kHz, about 15 kHz to about 35 kHz, about 15 kHz to about 40 kHz, about 15 kHz to about 45 kHz, about 15 kHz to about 50 kHz, about 20 kHz to about 25 kHz, about 20 kHz to about 30 kHz, about 20 kHz to about 35 kHz, about 20 kHz to about 40 kHz, about 20 kHz to about 45 kHz, about 20 kHz to about 50 kHz, about 25 kHz to about 30 kHz, about 25 kHz to about 35 kHz, about 25 kHz to about 40 kHz, about 25 kHz to about 45 kHz, about 25 kHz to about 50 kHz, about 30 kHz to about 35 kHz, about 30 kHz to about 40 kHz, about 30 kHz to about 45 kHz, about 30 kHz to about 50 kHz, about 35 kHz to about 40 kHz, about 35 kHz to about 45 kHz, about 35 kHz to about 50 kHz, about 40 kHz to about 45 kHz, about 40 kHz to about 50 kHz, or about 45 kHz to about 50 kHz, including increments therein. In some embodiments, the acoustic communications signals have a frequency of about 1 kHz, about 2 kHz, about 5 kHz, about 10 kHz, about 15 kHz, about 20 kHz, about 25 kHz, about 30 kHz, about 35 kHz, about 40 kHz, about 45 kHz, or about 50 kHz, including increments therein. In some embodiments, the acoustic communications signals have a frequency of at least about 1 kHz, about 2 kHz, about 5 kHz, about 10 kHz, about 15 kHz, about 20 kHz, about 25 kHz, about 30 kHz, about 35 kHz, about 40 kHz, or about 45 kHz, including increments therein. In some embodiments, the acoustic communications signals have a frequency of at most about 2 kHz, about 5 kHz, about 10 kHz, about 15 kHz, about 20 kHz, about 25 kHz, about 30 kHz, about 35 kHz, about 40 kHz, about 45 kHz, or about 50 kHz, including increments therein.

In some embodiments, the acoustic communications signals have a transmission rate of about 15 Kbps to about 1,000,000 Kbps, including increments therein. In some embodiments, the acoustic communications signals have a transmission rate of about 15 Kbps to about 50 Kbps, about 15 Kbps to about 100 Kbps, about 15 Kbps to about 500 Kbps, about 15 Kbps to about 1,000 Kbps, about 15 Kbps to about 5,000 Kbps, about 15 Kbps to about 10,000 Kbps, about 15 Kbps to about 50,000 Kbps, about 15 Kbps to about 100,000 Kbps, about 15 Kbps to about 500,000 Kbps, about 15 Kbps to about 1,000,000 Kbps, about 50 Kbps to about 100 Kbps, about 50 Kbps to about 500 Kbps, about 50 Kbps to about 1,000 Kbps, about 50 Kbps to about 5,000 Kbps, about 50 Kbps to about 10,000 Kbps, about 50 Kbps to about 50,000 Kbps, about 50 Kbps to about 100,000 Kbps, about 50 Kbps to about 500,000 Kbps, about 50 Kbps to about 1,000,000 Kbps, about 100 Kbps to about 500 Kbps, about 100 Kbps to about 1,000 Kbps, about 100 Kbps to about 5,000 Kbps, about 100 Kbps to about 10,000 Kbps, about 100 Kbps to about 50,000 Kbps, about 100 Kbps to about 100,000 Kbps, about 100 Kbps to about 500,000 Kbps, about 100 Kbps to about 1,000,000 Kbps, about 500 Kbps to about 1,000 Kbps, about 500 Kbps to about 5,000 Kbps, about 500 Kbps to about 10,000 Kbps, about 500 Kbps to about 50,000 Kbps, about 500 Kbps to about 100,000 Kbps, about 500 Kbps to about 500,000 Kbps, about 500 Kbps to about 1,000,000 Kbps, about 1,000 Kbps to about 5,000 Kbps, about 1,000 Kbps to about 10,000 Kbps, about 1,000 Kbps to about 50,000 Kbps, about 1,000 Kbps to about 100,000 Kbps, about 1,000 Kbps to about 500,000 Kbps, about 1,000 Kbps to about 1,000,000 Kbps, about 5,000 Kbps to about 10,000 Kbps, about 5,000 Kbps to about 50,000 Kbps, about 5,000 Kbps to about 100,000 Kbps, about 5,000 Kbps to about 500,000 Kbps, about 5,000 Kbps to about 1,000,000 Kbps, about 10,000 Kbps to about 50,000 Kbps, about 10,000 Kbps to about 100,000 Kbps, about 10,000 Kbps to about 500,000 Kbps, about 10,000 Kbps to about 1,000,000 Kbps, about 50,000 Kbps to about 100,000 Kbps, about 50,000 Kbps to about 500,000 Kbps, about 50,000 Kbps to about 1,000,000 Kbps, about 100,000 Kbps to about 500,000 Kbps, about 100,000 Kbps to about 1,000,000 Kbps, or about 500,000 Kbps to about 1,000,000 Kbps, including increments therein. In some embodiments, the acoustic communications signals have a transmission rate of about 15 Kbps, about 50 Kbps, about 100 Kbps, about 500 Kbps, about 1,000 Kbps, about 5,000 Kbps, about 10,000 Kbps, about 50,000 Kbps, about 100,000 Kbps, about 500,000 Kbps, or about 1,000,000 Kbps, including increments therein. In some embodiments, the acoustic communications signals have a transmission rate of at least about 15 Kbps, about 50 Kbps, about 100 Kbps, about 500 Kbps, about 1,000 Kbps, about 5,000 Kbps, about 10,000 Kbps, about 50,000 Kbps, about 100,000 Kbps, or about 500,000 Kbps, including increments therein. In some embodiments, the acoustic communications signals have a transmission rate of at most about 50 Kbps, about 100 Kbps, about 500 Kbps, about 1,000 Kbps, about 5,000 Kbps, about 10,000 Kbps, about 50,000 Kbps, about 100,000 Kbps, about 500,000 Kbps, or about 1,000,000 Kbps, including increments therein.

In some embodiments, the optical communications signals have a transmission rate of about 0.1 Mbps to about 2 Mbps, including increments therein. In some embodiments, the optical communications signals have a transmission rate of about 0.1 Mbps to about 0.2 Mbps, about 0.1 Mbps to about 0.3 Mbps, about 0.1 Mbps to about 0.4 Mbps, about 0.1 Mbps to about 0.5 Mbps, about 0.1 Mbps to about 0.7 Mbps, about 0.1 Mbps to about 0.9 Mbps, about 0.1 Mbps to about 1.1 Mbps, about 0.1 Mbps to about 1.3 Mbps, about 0.1 Mbps to about 1.5 Mbps, about 0.1 Mbps to about 1.7 Mbps, about 0.1 Mbps to about 2 Mbps, about 0.2 Mbps to about 0.3 Mbps, about 0.2 Mbps to about 0.4 Mbps, about 0.2 Mbps to about 0.5 Mbps, about 0.2 Mbps to about 0.7 Mbps, about 0.2 Mbps to about 0.9 Mbps, about 0.2 Mbps to about 1.1 Mbps, about 0.2 Mbps to about 1.3 Mbps, about 0.2 Mbps to about 1.5 Mbps, about 0.2 Mbps to about 1.7 Mbps, about 0.2 Mbps to about 2 Mbps, about 0.3 Mbps to about 0.4 Mbps, about 0.3 Mbps to about 0.5 Mbps, about 0.3 Mbps to about 0.7 Mbps, about 0.3 Mbps to about 0.9 Mbps, about 0.3 Mbps to about 1.1 Mbps, about 0.3 Mbps to about 1.3 Mbps, about 0.3 Mbps to about 1.5 Mbps, about 0.3 Mbps to about 1.7 Mbps, about 0.3 Mbps to about 2 Mbps, about 0.4 Mbps to about 0.5 Mbps, about 0.4 Mbps to about 0.7 Mbps, about 0.4 Mbps to about 0.9 Mbps, about 0.4 Mbps to about 1.1 Mbps, about 0.4 Mbps to about 1.3 Mbps, about 0.4 Mbps to about 1.5 Mbps, about 0.4 Mbps to about 1.7 Mbps, about 0.4 Mbps to about 2 Mbps, about 0.5 Mbps to about 0.7 Mbps, about 0.5 Mbps to about 0.9 Mbps, about 0.5 Mbps to about 1.1 Mbps, about 0.5 Mbps to about 1.3 Mbps, about 0.5 Mbps to about 1.5 Mbps, about 0.5 Mbps to about 1.7 Mbps, about 0.5 Mbps to about 2 Mbps, about 0.7 Mbps to about 0.9 Mbps, about 0.7 Mbps to about 1.1 Mbps, about 0.7 Mbps to about 1.3 Mbps, about 0.7 Mbps to about 1.5 Mbps, about 0.7 Mbps to about 1.7 Mbps, about 0.7 Mbps to about 2 Mbps, about 0.9 Mbps to about 1.1 Mbps, about 0.9 Mbps to about 1.3 Mbps, about 0.9 Mbps to about 1.5 Mbps, about 0.9 Mbps to about 1.7 Mbps, about 0.9 Mbps to about 2 Mbps, about 1.1 Mbps to about 1.3 Mbps, about 1.1 Mbps to about 1.5 Mbps, about 1.1 Mbps to about 1.7 Mbps, about 1.1 Mbps to about 2 Mbps, about 1.3 Mbps to about 1.5 Mbps, about 1.3 Mbps to about 1.7 Mbps, about 1.3 Mbps to about 2 Mbps, about 1.5 Mbps to about 1.7 Mbps, about 1.5 Mbps to about 2 Mbps, or about 1.7 Mbps to about 2 Mbps, including increments therein. In some embodiments, the optical communications signals have a transmission rate of about 0.1 Mbps, about 0.2 Mbps, about 0.3 Mbps, about 0.4 Mbps, about 0.5 Mbps, about 0.7 Mbps, about 0.9 Mbps, about 1.1 Mbps, about 1.3 Mbps, about 1.5 Mbps, about 1.7 Mbps, or about 2 Mbps, including increments therein. In some embodiments, the optical communications signals have a transmission rate of at least about 0.1 Mbps, about 0.2 Mbps, about 0.3 Mbps, about 0.4 Mbps, about 0.5 Mbps, about 0.7 Mbps, about 0.9 Mbps, about 1.1 Mbps, about 1.3 Mbps, about 1.5 Mbps, or about 1.7 Mbps, including increments therein. In some embodiments, the optical communications signals have a transmission rate of at most about 0.2 Mbps, about 0.3 Mbps, about 0.4 Mbps, about 0.5 Mbps, about 0.7 Mbps, about 0.9 Mbps, about 1.1 Mbps, about 1.3 Mbps, about 1.5 Mbps, about 1.7 Mbps, or about 2 Mbps, including increments therein.

In some embodiments, the optical communications system sends and receives optical communications signals along the bed of the aquatic environment over a distance of about 0.5 km to about 6 km, including increments therein. In some embodiments, the optical communications system sends and receives optical communications signals along the bed of the aquatic environment over a distance of about 0.5 km to about 1 km, about 0.5 km to about 1.5 km, about 0.5 km to about 2 km, about 0.5 km to about 2.5 km, about 0.5 km to about 3 km, about 0.5 km to about 3.5 km, about 0.5 km to about 4 km, about 0.5 km to about 4.5 km, about 0.5 km to about 5 km, about 0.5 km to about 5.5 km, about 0.5 km to about 6 km, about 1 km to about 1.5 km, about 1 km to about 2 km, about 1 km to about 2.5 km, about 1 km to about 3 km, about 1 km to about 3.5 km, about 1 km to about 4 km, about 1 km to about 4.5 km, about 1 km to about 5 km, about 1 km to about 5.5 km, about 1 km to about 6 km, about 1.5 km to about 2 km, about 1.5 km to about 2.5 km, about 1.5 km to about 3 km, about 1.5 km to about 3.5 km, about 1.5 km to about 4 km, about 1.5 km to about 4.5 km, about 1.5 km to about 5 km, about 1.5 km to about 5.5 km, about 1.5 km to about 6 km, about 2 km to about 2.5 km, about 2 km to about 3 km, about 2 km to about 3.5 km, about 2 km to about 4 km, about 2 km to about 4.5 km, about 2 km to about 5 km, about 2 km to about 5.5 km, about 2 km to about 6 km, about 2.5 km to about 3 km, about 2.5 km to about 3.5 km, about 2.5 km to about 4 km, about 2.5 km to about 4.5 km, about 2.5 km to about 5 km, about 2.5 km to about 5.5 km, about 2.5 km to about 6 km, about 3 km to about 3.5 km, about 3 km to about 4 km, about 3 km to about 4.5 km, about 3 km to about 5 km, about 3 km to about 5.5 km, about 3 km to about 6 km, about 3.5 km to about 4 km, about 3.5 km to about 4.5 km, about 3.5 km to about 5 km, about 3.5 km to about 5.5 km, about 3.5 km to about 6 km, about 4 km to about 4.5 km, about 4 km to about 5 km, about 4 km to about 5.5 km, about 4 km to about 6 km, about 4.5 km to about 5 km, about 4.5 km to about 5.5 km, about 4.5 km to about 6 km, about 5 km to about 5.5 km, about 5 km to about 6 km, or about 5.5 km to about 6 km, including increments therein. In some embodiments, the optical communications system sends and receives optical communications signals along the bed of the aquatic environment over a distance of about 0.5 km, about 1 km, about 1.5 km, about 2 km, about 2.5 km, about 3 km, about 3.5 km, about 4 km, about 4.5 km, about 5 km, about 5.5 km, or about 6 km, including increments therein. In some embodiments, the optical communications system sends and receives optical communications signals along the bed of the aquatic environment over a distance of at least about 0.5 km, about 1 km, about 1.5 km, about 2 km, about 2.5 km, about 3 km, about 3.5 km, about 4 km, about 4.5 km, about 5 km, or about 5.5 km. including increments therein. In some embodiments, the optical communications system sends and receives optical communications signals along the bed of the aquatic environment over a distance of at most about 1 km, about 1.5 km, about 2 km, about 2.5 km, about 3 km, about 3.5 km, about 4 km, about 4.5 km, about 5 km, about 5.5 km, or about 6 km, including increments therein.

In some embodiments, the acoustic communications system sends and receives acoustic communications signals between the bed of the aquatic environment and a surface of the aquatic environment over a distance of about 1 km to about 12 km, including increments therein. In some embodiments, the acoustic communications system sends and receives acoustic communications signals between the bed of the aquatic environment and a surface of the aquatic environment over a distance of about 1 km to about 2 km, about 1 km to about 3 km, about 1 km to about 4 km, about 1 km to about 5 km, about 1 km to about 6 km, about 1 km to about 7 km, about 1 km to about 8 km, about 1 km to about 9 km, about 1 km to about 10 km, about 1 km to about 11 km, about 1 km to about 12 km, about 2 km to about 3 km, about 2 km to about 4 km, about 2 km to about 5 km, about 2 km to about 6 km, about 2 km to about 7 km, about 2 km to about 8 km, about 2 km to about 9 km, about 2 km to about 10 km, about 2 km to about 11 km, about 2 km to about 12 km, about 3 km to about 4 km, about 3 km to about 5 km, about 3 km to about 6 km, about 3 km to about 7 km, about 3 km to about 8 km, about 3 km to about 9 km, about 3 km to about 10 km, about 3 km to about 11 km, about 3 km to about 12 km, about 4 km to about 5 km, about 4 km to about 6 km, about 4 km to about 7 km, about 4 km to about 8 km, about 4 km to about 9 km, about 4 km to about 10 km, about 4 km to about 11 km, about 4 km to about 12 km, about 5 km to about 6 km, about 5 km to about 7 km, about 5 km to about 8 km, about 5 km to about 9 km, about 5 km to about 10 km, about 5 km to about 11 km, about 5 km to about 12 km, about 6 km to about 7 km, about 6 km to about 8 km, about 6 km to about 9 km, about 6 km to about 10 km, about 6 km to about 11 km, about 6 km to about 12 km, about 7 km to about 8 km, about 7 km to about 9 km, about 7 km to about 10 km, about 7 km to about 11 km, about 7 km to about 12 km, about 8 km to about 9 km, about 8 km to about 10 km, about 8 km to about 11 km, about 8 km to about 12 km, about 9 km to about 10 km, about 9 km to about 11 km, about 9 km to about 12 km, about 10 km to about 11 km, about 10 km to about 12 km, or about 11 km to about 12 km. In some embodiments, the acoustic communications system sends and receives acoustic communications signals between the bed of the aquatic environment and a surface of the aquatic environment over a distance of about 1 km, about 2 km, about 3 km, about 4 km, about 5 km, about 6 km, about 7 km, about 8 km, about 9 km, about 10 km, about 11 km, or about 12 km, including increments therein. In some embodiments, the acoustic communications system sends and receives acoustic communications signals between the bed of the aquatic environment and a surface of the aquatic environment over a distance of at least about 1 km, about 2 km, about 3 km, about 4 km, about 5 km, about 6 km, about 7 km, about 8 km, about 9 km, about 10 km, or about 11 km, including increments therein. In some embodiments, the acoustic communications system sends and receives acoustic communications signals between the bed of the aquatic environment and a surface of the aquatic environment over a distance of at most about 2 km, about 3 km, about 4 km, about 5 km, about 6 km, about 7 km, about 8 km, about 9 km, about 10 km, about 11 km, or about 12 km, including increments therein.

In some embodiments, the optical noise zone is generated at least in part by ambient light and debris in the water. In further embodiments, the optical noise zone extends from the surface of the aquatic environment down into the water column to an optical noise depth based, for example, on the strength of the ambient light, the type of debris in the water, and the distribution of debris in the water. In some embodiments, the acoustic noise zone is generated at least in part by the operation of machinery at the surface of the aquatic environment, in the water column, on the bed of the aquatic environment, or at the surface of the aquatic environment, in the water column, and on the bed of the aquatic environment. In further embodiments, the acoustic noise zone extends from one or more sources of acoustic noise out into the aquatic environment to an acoustic noise distance based, for example, on the type of noise source(s), the level of acoustic noise generated, and the frequency of the acoustic noise generated.

Another aspect provided herein is a hybrid optical/acoustic wireless communications platform for an aquatic environment, the aquatic environment comprising: an optical noise zone extending from a surface of the aquatic environment to an optical noise depth throughout the aquatic environment; and an acoustic noise zone extending from the surface of the aquatic environment to a bed of the aquatic environment out to an acoustic noise distance into the aquatic environment; the platform comprising: an optical communications system configured to: send optical communications signals from within the acoustic noise zone and transmit the optical communications signals to beyond the acoustic noise distance; and receive optical communications signals from beyond the acoustic noise distance and transmit the optical communications signals to within the acoustic noise zone; an optical/acoustic communications signal converter; and an acoustic communications system configured to: send acoustic communications signals from within the optical noise zone and transmit the acoustic communications signals to beyond the optical noise depth; and receive acoustic communications signals from beyond the optical noise distance and transmit the acoustic communications signals to within the optical noise zone.

In some embodiments, the aquatic environment is a marine environment. In some embodiments, the bed of the marine environment is a deep seabed. In some embodiments, the optical communications signals comprise laser. In some embodiments, the acoustic communications system comprises a buoy at the surface of the aquatic environment. In some embodiments, the acoustic communications system comprises a vehicle at the surface of the aquatic environment. In some embodiments, the vehicle is an unmanned vehicle. In some embodiments, the unmanned vehicle is unmoored and untethered. In some embodiments, the vehicle at the surface of the aquatic environment transmits/ receives a surface signal. In some embodiments, the optical/ acoustic communications signal converter is positioned at the bed of the aquatic environment. In some embodiments, the optical/acoustic communications signal converter is configured to: a) receive optical communications signals from the optical communications system and transmit corresponding acoustic communications signals to the acoustic communications system; and b) receive acoustic communications signals from the acoustic communications system and transmit corresponding optical communications signals to the optical communications system. In some embodiments, the optical/acoustic communications signal converter receives communications signals at a first data rate and transmits communications signals at a second data rate that is less than the first data rate.

In some embodiments, the one or more optical repeaters are separated from each other by about 100 m to about 600 m. In some embodiments, the one or more optical repeaters are separated from each other by about 100 m to about 150 m, about 100 m to about 200 m, about 100 m to about 250 m, about 100 m to about 300 m, about 100 m to about 350 m, about 100 m to about 400 m, about 100 m to about 450 m, about 100 m to about 500 m, about 100 m to about 550 m, about 100 m to about 600 m, about 150 m to about 200 m, about 150 m to about 250 m, about 150 m to about 300 m, about 150 m to about 350 m, about 150 m to about 400 m, about 150 m to about 450 m, about 150 m to about 500 m, about 150 m to about 550 m, about 150 m to about 600 m, about 200 m to about 250 m, about 200 m to about 300 m, about 200 m to about 350 m, about 200 m to about 400 m, about 200 m to about 450 m, about 200 m to about 500 m, about 200 m to about 550 m, about 200 m to about 600 m, about 250 m to about 300 m, about 250 m to about 350 m, about 250 m to about 400 m, about 250 m to about 450 m, about 250 m to about 500 m, about 250 m to about 550 m, about 250 m to about 600 m, about 300 m to about 350 m, about 300 m to about 400 m, about 300 m to about 450 m, about 300 m to about 500 m, about 300 m to about 550 m, about 300 m to about 600 m, about 350 m to about 400 m, about 350 m to about 450 m, about 350 m to about 500 m, about 350 m to about 550 m, about 350 m to about 600 m, about 400 m to about 450 m, about 400 m to about 500 m, about 400 m to about 550 m, about 400 m to about 600 m, about 450 m to about 500 m, about 450 m to about 550 m, about 450 m to about 600 m, about 500 m to about 550 m, about 500 m to about 600 m, or about 550 m to about 600 m. In some embodiments, the one or more optical repeaters are separated from each other by about 100 m, about 150 m, about 200 m, about 250 m, about 300 m, about 350 m, about 400 m, about 450 m, about 500 m, about 550 m, or about 600 m. In some embodiments, the one or more optical repeaters are separated from each other by at least about 100 m, about 150 m, about 200 m, about 250 m, about 300 m, about 350 m, about 400 m, about 450 m, about 500 m, or about 550 m. In some embodiments, the one or more optical repeaters are separated from each other by at most about 150 m, about 200 m, about 250 m, about 300 m, about 350 m, about 400 m, about 450 m, about 500 m, about 550 m, or about 600 m.

In some embodiments, the optical repeater has a range of about 100 m to about 600 m. In some embodiments, the optical repeater has a range of about 100 m to about 150 m, about 100 m to about 200 m, about 100 m to about 250 m, about 100 m to about 300 m, about 100 m to about 350 m, about 100 m to about 400 m, about 100 m to about 450 m, about 100 m to about 500 m, about 100 m to about 550 m, about 100 m to about 600 m, about 150 m to about 200 m, about 150 m to about 250 m, about 150 m to about 300 m, about 150 m to about 350 m, about 150 m to about 400 m, about 150 m to about 450 m, about 150 m to about 500 m, about 150 m to about 550 m, about 150 m to about 600 m, about 200 m to about 250 m, about 200 m to about 300 m, about 200 m to about 350 m, about 200 m to about 400 m, about 200 m to about 450 m, about 200 m to about 500 m, about 200 m to about 550 m, about 200 m to about 600 m, about 250 m to about 300 m, about 250 m to about 350 m, about 250 m to about 400 m, about 250 m to about 450 m, about 250 m to about 500 m, about 250 m to about 550 m, about 250 m to about 600 m, about 300 m to about 350 m, about 300 m to about 400 m, about 300 m to about 450 m, about 300 m to about 500 m, about 300 m to about 550 m, about 300 m to about 600 m, about 350 m to about 400 m, about 350 m to about 450 m, about 350 m to about 500 m, about 350 m to about 550 m, about 350 m to about 600 m, about 400 m to about 450 m, about 400 m to about 500 m, about 400 m to about 550 m, about 400 m to about 600 m, about 450 m to about 500 m, about 450 m to about 550 m, about 450 m to about 600 m, about 500 m to about 550 m, about 500 m to about 600 m, or about 550 m to about 600 m. In some embodiments, the optical repeater has a range of about 100 m, about 150 m, about 200 m, about 250 m, about 300 m, about 350 m, about 400 m, about 450 m, about 500 m, about 550 m, or about 600 m. In some embodiments, the optical repeater has a range of at least about 100 m, about 150 m, about 200 m, about 250 m, about 300 m, about 350 m, about 400 m, about 450 m, about 500 m, or about 550 m. In some embodiments, the optical repeater has a range of at most about 150 m, about 200 m, about 250 m, about 300 m, about 350 m, about 400 m, about 450 m, about 500 m, about 550 m, or about 600 m.

In some embodiments, the acoustic communications signals have a frequency of about 1 kHz to about 50 kHz. In some embodiments, the acoustic communications signals have a frequency of about 1 kHz to about 2 kHz, about 1 kHz to about 5 kHz, about 1 kHz to about 10 kHz, about 1 kHz to about 15 kHz, about 1 kHz to about 20 kHz, about 1 kHz to about 25 kHz, about 1 kHz to about 30 kHz, about 1 kHz to about 35 kHz, about 1 kHz to about 40 kHz, about 1 kHz to about 45 kHz, about 1 kHz to about 50 kHz, about 2 kHz to about 5 kHz, about 2 kHz to about 10 kHz, about 2 kHz to about 15 kHz, about 2 kHz to about 20 kHz, about 2 kHz to about 25 kHz, about 2 kHz to about 30 kHz, about 2 kHz to about 35 kHz, about 2 kHz to about 40 kHz, about 2 kHz to about 45 kHz, about 2 kHz to about 50 kHz, about 5 kHz to about 10 kHz, about 5 kHz to about 15 kHz, about 5 kHz to about 20 kHz, about 5 kHz to about 25 kHz, about 5 kHz to about 30 kHz, about 5 kHz to about 35 kHz, about 5 kHz to about 40 kHz, about 5 kHz to about 45 kHz, about 5 kHz to about 50 kHz, about 10 kHz to about 15 kHz, about 10 kHz to about 20 kHz, about 10 kHz to about 25 kHz, about 10 kHz to about 30 kHz, about 10 kHz to about 35 kHz, about 10 kHz to about 40 kHz, about 10 kHz to about 45 kHz, about 10 kHz to about 50 kHz, about 15 kHz to about 20 kHz, about 15 kHz to about 25 kHz, about 15 kHz to about 30 kHz, about 15 kHz to about 35 kHz, about 15 kHz to about 40 kHz, about 15 kHz to about 45 kHz, about 15 kHz to about 50 kHz, about 20 kHz to about 25 kHz, about 20 kHz to about 30 kHz, about 20 kHz to about 35 kHz, about 20 kHz to about 40 kHz, about 20 kHz to about 45 kHz, about 20 kHz to about 50 kHz, about 25 kHz to about 30 kHz, about 25 kHz to about 35 kHz, about 25 kHz to about 40 kHz, about 25 kHz to about 45 kHz, about 25 kHz to about 50 kHz, about 30 kHz to about 35 kHz, about 30 kHz to about 40 kHz, about 30 kHz to about 45 kHz, about 30 kHz to about 50 kHz, about 35 kHz to about 40 kHz, about 35 kHz to about 45 kHz, about 35 kHz to about 50 kHz, about 40 kHz to about 45 kHz, about 40 kHz to about 50 kHz, or about 45 kHz to about 50 kHz. In some embodiments, the acoustic communications signals have a frequency of about 1 kHz, about 2 kHz, about 5 kHz, about 10 kHz, about 15 kHz, about 20 kHz, about 25 kHz, about 30 kHz, about 35 kHz, about 40 kHz, about 45 kHz, or about 50 kHz, including increments therein. In some embodiments, the acoustic communications signals have a frequency of at least about 1 kHz, about 2 kHz, about 5 kHz, about 10 kHz, about 15 kHz, about 20 kHz, about 25 kHz, about 30 kHz, about 35 kHz, about 40 kHz, or about 45 kHz, including increments therein. In some embodiments, the acoustic communications signals have a frequency of at most about 2 kHz, about 5 kHz, about 10 kHz, about 15 kHz, about 20 kHz, about 25 kHz, about 30 kHz, about 35 kHz, about 40 kHz, about 45 kHz, or about 50 kHz, including increments therein.

In some embodiments, the acoustic communications signals have a transmission rate of about 15 Kbps to about 1,000 Kbps. In some embodiments, the acoustic communications signals have a transmission rate of about 15 Kbps to about 25 Kbps, about 15 Kbps to about 50 Kbps, about 15 Kbps to about 100 Kbps, about 15 Kbps to about 200 Kbps, about 15 Kbps to about 300 Kbps, about 15 Kbps to about 400 Kbps, about 15 Kbps to about 500 Kbps, about 15 Kbps to about 600 Kbps, about 15 Kbps to about 700 Kbps, about 15 Kbps to about 800 Kbps, about 15 Kbps to about 1,000 Kbps, about 25 Kbps to about 50 Kbps, about 25 Kbps to about 100 Kbps, about 25 Kbps to about 200 Kbps, about 25 Kbps to about 300 Kbps, about 25 Kbps to about 400 Kbps, about 25 Kbps to about 500 Kbps, about 25 Kbps to about 600 Kbps, about 25 Kbps to about 700 Kbps, about 25 Kbps to about 800 Kbps, about 25 Kbps to about 1,000 Kbps, about 50 Kbps to about 100 Kbps, about 50 Kbps to about 200 Kbps, about 50 Kbps to about 300 Kbps, about 50 Kbps to about 400 Kbps, about 50 Kbps to about 500 Kbps, about 50 Kbps to about 600 Kbps, about 50 Kbps to about 700 Kbps, about 50 Kbps to about 800 Kbps, about 50 Kbps to about 1,000 Kbps, about 100 Kbps to about 200 Kbps, about 100 Kbps to about 300 Kbps, about 100 Kbps to about 400 Kbps, about 100 Kbps to about 500 Kbps, about 100 Kbps to about 600 Kbps, about 100 Kbps to about 700 Kbps, about 100 Kbps to about 800 Kbps, about 100 Kbps to about 1,000 Kbps, about 200 Kbps to about 300 Kbps, about 200 Kbps to about 400 Kbps, about 200 Kbps to about 500 Kbps, about 200 Kbps to about 600 Kbps, about 200 Kbps to about 700 Kbps, about 200 Kbps to about 800 Kbps, about 200 Kbps to about 1,000 Kbps, about 300 Kbps to about 400 Kbps, about 300 Kbps to about 500 Kbps, about 300 Kbps to about 600 Kbps, about 300 Kbps to about 700 Kbps, about 300 Kbps to about 800 Kbps, about 300 Kbps to about 1,000 Kbps, about 400 Kbps to about 500 Kbps, about 400 Kbps to about 600 Kbps, about 400 Kbps to about 700 Kbps, about 400 Kbps to about 800 Kbps, about 400 Kbps to about 1,000 Kbps, about 500 Kbps to about 600 Kbps, about 500 Kbps to about 700 Kbps, about 500 Kbps to about 800 Kbps, about 500 Kbps to about 1,000 Kbps, about 600 Kbps to about 700 Kbps, about 600 Kbps to about 800 Kbps, about 600 Kbps to about 1,000 Kbps, about 700 Kbps to about 800 Kbps, about 700 Kbps to about 1,000 Kbps, or about 800 Kbps to about 1,000 Kbps. In some embodiments, the acoustic communications signals have a transmission rate of about 15 Kbps, about 25 Kbps, about 50 Kbps, about 100 Kbps, about 200 Kbps, about 300 Kbps, about 400 Kbps, about 500 Kbps, about 600 Kbps, about 700 Kbps, about 800 Kbps, or about 1,000 Kbps, including increments therein. In some embodiments, the acoustic communications signals have a transmission rate of at least about 15 Kbps, about 25 Kbps, about 50 Kbps, about 100 Kbps, about 200 Kbps, about 300 Kbps, about 400 Kbps, about 500 Kbps, about 600 Kbps, about 700 Kbps, or about 800 Kbps, including increments therein. In some embodiments, the acoustic communications signals have a transmission rate of at most about 25 Kbps, about 50 Kbps, about 100 Kbps, about 200 Kbps, about 300 Kbps, about 400 Kbps, about 500 Kbps, about 600 Kbps, about 700 Kbps, about 800 Kbps, or about 1,000 Kbps, including increments therein.

In some embodiments, the optical communications signals have a transmission rate of about 0.1 Mbps to about 2 Mbps, including increments therein. In some embodiments, the optical communications signals have a transmission rate of about 0.1 Mbps to about 0.2 Mbps, about 0.1 Mbps to about 0.3 Mbps, about 0.1 Mbps to about 0.4 Mbps, about 0.1 Mbps to about 0.5 Mbps, about 0.1 Mbps to about 0.7 Mbps, about 0.1 Mbps to about 0.9 Mbps, about 0.1 Mbps to about 1.1 Mbps, about 0.1 Mbps to about 1.3 Mbps, about 0.1 Mbps to about 1.5 Mbps, about 0.1 Mbps to about 1.7 Mbps, about 0.1 Mbps to about 2 Mbps, about 0.2 Mbps to about 0.3 Mbps, about 0.2 Mbps to about 0.4 Mbps, about 0.2 Mbps to about 0.5 Mbps, about 0.2 Mbps to about 0.7 Mbps, about 0.2 Mbps to about 0.9 Mbps, about 0.2 Mbps to about 1.1 Mbps, about 0.2 Mbps to about 1.3 Mbps, about 0.2 Mbps to about 1.5 Mbps, about 0.2 Mbps to about 1.7 Mbps, about 0.2 Mbps to about 2 Mbps, about 0.3 Mbps to about 0.4 Mbps, about 0.3 Mbps to about 0.5 Mbps, about 0.3 Mbps to about 0.7 Mbps, about 0.3 Mbps to about 0.9 Mbps, about 0.3 Mbps to about 1.1 Mbps, about 0.3 Mbps to about 1.3 Mbps, about 0.3 Mbps to about 1.5 Mbps, about 0.3 Mbps to about 1.7 Mbps, about 0.3 Mbps to about 2 Mbps, about 0.4 Mbps to about 0.5 Mbps, about 0.4 Mbps to about 0.7 Mbps, about 0.4 Mbps to about 0.9 Mbps, about 0.4 Mbps to about 1.1 Mbps, about 0.4 Mbps to about 1.3 Mbps, about 0.4 Mbps to about 1.5 Mbps, about 0.4 Mbps to about 1.7 Mbps, about 0.4 Mbps to about 2 Mbps, about 0.5 Mbps to about 0.7 Mbps, about 0.5 Mbps to about 0.9 Mbps, about 0.5 Mbps to about 1.1 Mbps, about 0.5 Mbps to about 1.3 Mbps, about 0.5 Mbps to about 1.5 Mbps, about 0.5 Mbps to about 1.7 Mbps, about 0.5 Mbps to about 2 Mbps, about 0.7 Mbps to about 0.9 Mbps, about 0.7 Mbps to about 1.1 Mbps, about 0.7 Mbps to about 1.3 Mbps, about 0.7 Mbps to about 1.5 Mbps, about 0.7 Mbps to about 1.7 Mbps, about 0.7 Mbps to about 2 Mbps, about 0.9 Mbps to about 1.1 Mbps, about 0.9 Mbps to about 1.3 Mbps, about 0.9 Mbps to about 1.5 Mbps, about 0.9 Mbps to about 1.7 Mbps, about 0.9 Mbps to about 2 Mbps, about 1.1 Mbps to about 1.3 Mbps, about 1.1 Mbps to about 1.5 Mbps, about 1.1 Mbps to about 1.7 Mbps, about 1.1 Mbps to about 2 Mbps, about 1.3 Mbps to about 1.5 Mbps, about 1.3 Mbps to about 1.7 Mbps, about 1.3 Mbps to about 2 Mbps, about 1.5 Mbps to about 1.7 Mbps, about 1.5 Mbps to about 2 Mbps, or about 1.7 Mbps to about 2 Mbps, including increments therein. In some embodiments, the optical communications signals have a transmission rate of about 0.1 Mbps, about 0.2 Mbps, about 0.3 Mbps, about 0.4 Mbps, about 0.5 Mbps, about 0.7 Mbps, about 0.9 Mbps, about 1.1 Mbps, about 1.3 Mbps, about 1.5 Mbps, about 1.7 Mbps, or about 2 Mbps, including increments therein. In some embodiments, the optical communications signals have a transmission rate of at least about 0.1 Mbps, about 0.2 Mbps, about 0.3 Mbps, about 0.4 Mbps, about 0.5 Mbps, about 0.7 Mbps, about 0.9 Mbps, about 1.1 Mbps, about 1.3 Mbps, about 1.5 Mbps, or about 1.7 Mbps, including increments therein. In some embodiments, the optical communications signals have a transmission rate of at most about 0.2 Mbps, about 0.3 Mbps, about 0.4 Mbps, about 0.5 Mbps, about 0.7 Mbps, about 0.9 Mbps, about 1.1 Mbps, about 1.3 Mbps, about 1.5 Mbps, about 1.7 Mbps, or about 2 Mbps, including increments therein.

In some embodiments, the optical communications system sends and receives optical communications signals along the bed of the aquatic environment over a distance of about 0.5 km to about 6 km. In some embodiments, the optical communications system sends and receives optical communications signals along the bed of the aquatic environment over a distance of about 0.5 km to about 1 km, about 0.5 km to about 1.5 km, about 0.5 km to about 2 km, about 0.5 km to about 2.5 km, about 0.5 km to about 3 km, about 0.5 km to about 3.5 km, about 0.5 km to about 4 km, about 0.5 km to about 4.5 km, about 0.5 km to about 5 km, about 0.5 km to about 5.5 km, about 0.5 km to about 6 km, about 1 km to about 1.5 km, about 1 km to about 2 km, about 1 km to about 2.5 km, about 1 km to about 3 km, about 1 km to about 3.5 km, about 1 km to about 4 km, about 1 km to about 4.5 km, about 1 km to about 5 km, about 1 km to about 5.5 km, about 1 km to about 6 km, about 1.5 km to about 2 km, about 1.5 km to about 2.5 km, about 1.5 km to about 3 km, about 1.5 km to about 3.5 km, about 1.5 km to about 4 km, about 1.5 km to about 4.5 km, about 1.5 km to about 5 km, about 1.5 km to about 5.5 km, about 1.5 km to about 6 km, about 2 km to about 2.5 km, about 2 km to about 3 km, about 2 km to about 3.5 km, about 2 km to about 4 km, about 2 km to about 4.5 km, about 2 km to about 5 km, about 2 km to about 5.5 km, about 2 km to about 6 km, about 2.5 km to about 3 km, about 2.5 km to about 3.5 km, about 2.5 km to about 4 km, about 2.5 km to about 4.5 km, about 2.5 km to about 5 km, about 2.5 km to about 5.5 km, about 2.5 km to about 6 km, about 3 km to about 3.5 km, about 3 km to about 4 km, about 3 km to about 4.5 km, about 3 km to about 5 km, about 3 km to about 5.5 km, about 3 km to about 6 km, about 3.5 km to about 4 km, about 3.5 km to about 4.5 km, about 3.5 km to about 5 km, about 3.5 km to about 5.5 km, about 3.5 km to about 6 km, about 4 km to about 4.5 km, about 4 km to about 5 km, about 4 km to about 5.5 km, about 4 km to about 6 km, about 4.5 km to about 5 km, about 4.5 km to about 5.5 km, about 4.5 km to about 6 km, about 5 km to about 5.5 km, about 5 km to about 6 km, or about 5.5 km to about 6 km. In some embodiments, the optical communications system sends and receives optical communications signals along the bed of the aquatic environment over a distance of about 0.5 km, about 1 km, about 1.5 km, about 2 km, about 2.5 km, about 3 km, about 3.5 km, about 4 km, about 4.5 km, about 5 km, about 5.5 km, or about 6 km, including increments therein. In some embodiments, the optical communications system sends and receives optical communications signals along the bed of the aquatic environment over a distance of at least about 0.5 km, about 1 km, about 1.5 km, about 2 km, about 2.5 km, about 3 km, about 3.5 km, about 4 km, about 4.5 km, about 5 km, or about 5.5 km, including increments therein. In some embodiments, the optical communications system sends and receives optical communications signals along the bed of the aquatic environment over a distance of at most about 1 km, about 1.5 km, about 2 km, about 2.5 km, about 3 km, about 3.5 km, about 4 km, about 4.5 km, about 5 km, about 5.5 km, or about 6 km, including increments therein.

In some embodiments, the acoustic communications system sends and receives acoustic communications signals between the bed of the aquatic environment and a surface of the aquatic environment over a distance of about 1 km to about 12 km. In some embodiments, the acoustic communications system sends and receives acoustic communications signals between the bed of the aquatic environment and a surface of the aquatic environment over a distance of about 1 km to about 2 km, about 1 km to about 3 km, about 1 km to about 4 km, about 1 km to about 5 km, about 1 km to about 6 km, about 1 km to about 7 km, about 1 km to about 8 km, about 1 km to about 9 km, about 1 km to about 10 km, about 1 km to about 11 km, about 1 km to about 12 km, about 2 km to about 3 km, about 2 km to about 4 km, about 2 km to about 5 km, about 2 km to about 6 km, about 2 km to about 7 km, about 2 km to about 8 km, about 2 km to about 9 km, about 2 km to about 10 km, about 2 km to about 11 km, about 2 km to about 12 km, about 3 km to about 4 km, about 3 km to about 5 km, about 3 km to about 6 km, about 3 km to about 7 km, about 3 km to about 8 km, about 3 km to about 9 km, about 3 km to about 10 km, about 3 km to about 11 km, about 3 km to about 12 km, about 4 km to about 5 km, about 4 km to about 6 km, about 4 km to about 7 km, about 4 km to about 8 km, about 4 km to about 9 km, about 4 km to about 10 km, about 4 km to about 11 km, about 4 km to about 12 km, about 5 km to about 6 km, about 5 km to about 7 km, about 5 km to about 8 km, about 5 km to about 9 km, about 5 km to about 10 km, about 5 km to about 11 km, about 5 km to about 12 km, about 6 km to about 7 km, about 6 km to about 8 km, about 6 km to about 9 km, about 6 km to about 10 km, about 6 km to about 11 km, about 6 km to about 12 km, about 7 km to about 8 km, about 7 km to about 9 km, about 7 km to about 10 km, about 7 km to about 11 km, about 7 km to about 12 km, about 8 km to about 9 km, about 8 km to about 10 km, about 8 km to about 11 km, about 8 km to about 12 km, about 9 km to about 10 km, about 9 km to about 11 km, about 9 km to about 12 km, about 10 km to about 11 km, about 10 km to about 12 km, or about 11 km to about 12 km. In some embodiments, the acoustic communications system sends and receives acoustic communications signals between the bed of the aquatic environment and a surface of the aquatic environment over a distance of about 1 km, about 2 km, about 3 km, about 4 km, about 5 km, about 6 km, about 7 km, about 8 km, about 9 km, about 10 km, about 11 km, or about 12 km, including increments therein. In some embodiments, the acoustic communications system sends and receives acoustic communications signals between the bed of the aquatic environment and a surface of the aquatic environment over a distance of at least about 1 km, about 2 km, about 3 km, about 4 km, about 5 km, about 6 km, about 7 km, about 8 km, about 9 km, about 10 km, or about 11 km, including increments therein. In some embodiments, the acoustic communications system sends and receives acoustic communications signals between the bed of the aquatic environment and a surface of the aquatic environment over a distance of at most about 2 km, about 3 km, about 4 km, about 5 km, about 6 km, about 7 km, about 8 km, about 9 km, about 10 km, about 11 km, or about 12 km, including increments therein.

In some embodiments, the optical noise zone is generated at least in part by ambient light and debris in the water. In some embodiments, the acoustic noise zone is generated at least in part by the operation of machinery at the surface of the aquatic environment, on the bed of the aquatic environment, or both at the surface of and on the bed of the aquatic environment.

Another aspect provided herein is a method of conducting wireless communications in an aquatic environment, wherein the aquatic environment comprises: an optical noise zone extending from a surface of the aquatic environment to an optical noise depth throughout the aquatic environment; and an acoustic noise zone extending from the surface of the aquatic environment to a bed of the aquatic environment out to an acoustic noise distance into the aquatic environment; wherein the method comprises: generating, at an optical communications system, optical communications signals from within the acoustic noise zone and transmitting the optical communications signals to beyond the acoustic noise distance; receiving, at an optical/acoustic communications signal converter, optical communications signals from the optical communications system and transmitting corresponding acoustic communications signals; and receiving, by the acoustic communications system, acoustic communications signals from beyond the optical noise distance and transmitting the acoustic communications signals to within the optical noise zone.

In some embodiments, the aquatic environment is a marine environment. In further embodiments, the bed of the marine environment is a deep seabed. In some embodiments, the optical communications signals comprise laser. In some embodiments, the acoustic communications system comprises a buoy at the surface of the aquatic environment. In some embodiments, the acoustic communications system comprises a vehicle at the surface of the aquatic environment. In further embodiments, the vehicle is an unmanned vehicle. In still further embodiments, the unmanned vehicle is unmoored and untethered. In some embodiments, the vehicle at the surface of the aquatic environment transmits/receives a surface signal. In some embodiments, the optical/acoustic communications signal converter is positioned at the bed of the aquatic environment. In some embodiments, the optical/acoustic communications signal converter receives communications signals at a first data rate and transmits communications signals at a second data rate that is less than the first data rate. In some embodiments, the optical communications system comprises one or more optical repeaters. In further embodiments, the one or more optical repeaters are separated from each other by about 100 m to about 600 m. In further embodiments, the one or more optical repeaters has a range of about 100 m to about 600 m. In some embodiments, the acoustic communications signals have a frequency of about 1 KHz to about 50 KHz. In some embodiments, the acoustic communications signals have a transmission rate of about 15 Kbps to about 1 Gbps. In some embodiments, the optical communications signals have a transmission rate of about 0.1 Mbps to about 2 Mbps. In some embodiments, the optical communications system sends and receives optical communications signals along the bed of the aquatic environment over a distance of about 0.5 km to about 6 km. In some embodiments, the acoustic communications system sends and receives acoustic communications signals between the bed of the aquatic environment and a surface of the aquatic environment over a distance of about 1 km to about 12 km. In particular embodiments, the optical noise zone is generated at least in part by ambient light and debris in the water. In particular embodiments, the acoustic noise zone is generated at least in part by the operation of machinery at the surface of the aquatic environment, on the bed of the aquatic environment, or both at the surface of and on the bed of the aquatic environment.

Another aspect provided herein is a method of conducting wireless communications in an aquatic environment, wherein the aquatic environment comprises: an optical noise zone extending from a surface of the aquatic environment to an optical noise depth throughout the aquatic environment; and an acoustic noise zone extending from the surface of the aquatic environment to a bed of the aquatic environment out to an acoustic noise distance into the aquatic environment; wherein the method comprises: generating, by an acoustic communications system, acoustic communications signals from within the optical noise zone and transmitting the acoustic communications signals to beyond the optical noise depth; receiving, at an optical/acoustic communications signal converter, acoustic communications signals from the acoustic communications system and transmitting corresponding optical communications signals; and receiving, at an optical communications system, optical communications signals from beyond the acoustic noise distance and transmitting the optical communications signals to within the acoustic noise zone.

In some embodiments, the aquatic environment is a marine environment. In further embodiments, the bed of the marine environment is a deep seabed. In some embodiments, the optical communications signals comprise laser. In some embodiments, the acoustic communications system comprises a buoy at the surface of the aquatic environment. In some embodiments, the acoustic communications system comprises a vehicle at the surface of the aquatic environment. In further embodiments, the vehicle is an unmanned vehicle. In still further embodiments, the unmanned vehicle is unmoored and untethered. In some embodiments, the vehicle at the surface of the aquatic environment transmits/receives a surface signal. In some embodiments, the optical/acoustic communications signal converter is positioned at the bed of the aquatic environment. In some embodiments, the optical/acoustic communications signal converter receives communications signals at a first data rate and transmits communications signals at a second data rate that is less than the first data rate. In some embodiments, the optical communications system comprises one or more optical repeaters. In further embodiments, the one or more optical repeaters are separated from each other by about 100 m to about 600 m. In further embodiments, the one or more optical repeaters has a range of about 100 m to about 600 m. In some embodiments, the acoustic communications signals have a frequency of about 1 KHz to about 50 KHz. In some embodiments, the acoustic communications signals have a transmission rate of about 15 Kbps to about 1 Gbps. In some embodiments, the optical communications signals have a transmission rate of about 0.1 Mbps to about 2 Mbps. In some embodiments, the optical communications system sends and receives optical communications signals along the bed of the aquatic environment over a distance of about 0.5 km to about 6 km. In some embodiments, the acoustic communications system sends and receives acoustic communications signals between the bed of the aquatic environment and a surface of the aquatic environment over a distance of about 1 km to about 12 km. In particular embodiments, the optical noise zone is generated at least in part by ambient light and debris in the water. In particular embodiments, the acoustic noise zone is generated at least in part by the operation of machinery at the surface of the aquatic environment, on the bed of the aquatic environment, or both at the surface of and on the bed of the aquatic environment.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Wireless communication between components within and through the optical and acoustic noise fields is necessary to ensures safety and efficiency of ocean and sea operations such as oil and gas production.

Aquatic construction and production implement machinery at the surface, on the bed, or within aquatic environments, as well as sensors distributed on the bed of the aquatic environment. In some cases, the sensors are installed after the construction of the aquatic production assets. In such cases, the instillation of an underwater wireless communication network to retrieve the sensor data is cheaper and easier than attaching each new sensor directly to the production implement machinery at the surface, on the bed, or within aquatic environments. However, acoustic noise from the aquatic production assets forms acoustic noise zones within an acoustic noise distance from the aquatic production assets and therefor inhibits wireless acoustic transmission therein or therethrough. Further, optical noise zones within shallow aquatic environments reduce the quality of wireless optical transmission therein or therethrough.

As such, the platforms herein transmit and receive optical communications signals through and out of the acoustic noise field generated from noise-emitting underwater equipment. The platforms then transmit and receive acoustic communication signals through the optical noise field. By leveraging the strengths of optical and acoustic communications, the platforms herein mitigate the vulnerabilities of the respective communication forms to provide a robust communications network. Such a wireless communication network enables the use of increased underwater sensors, reduces the cost of installing further underwater sensors, and ensures safety and efficiency of ocean and sea operations such as oil and gas production.

Hybrid Optical/Acoustic Wireless Communications Platforms

Figure 1:
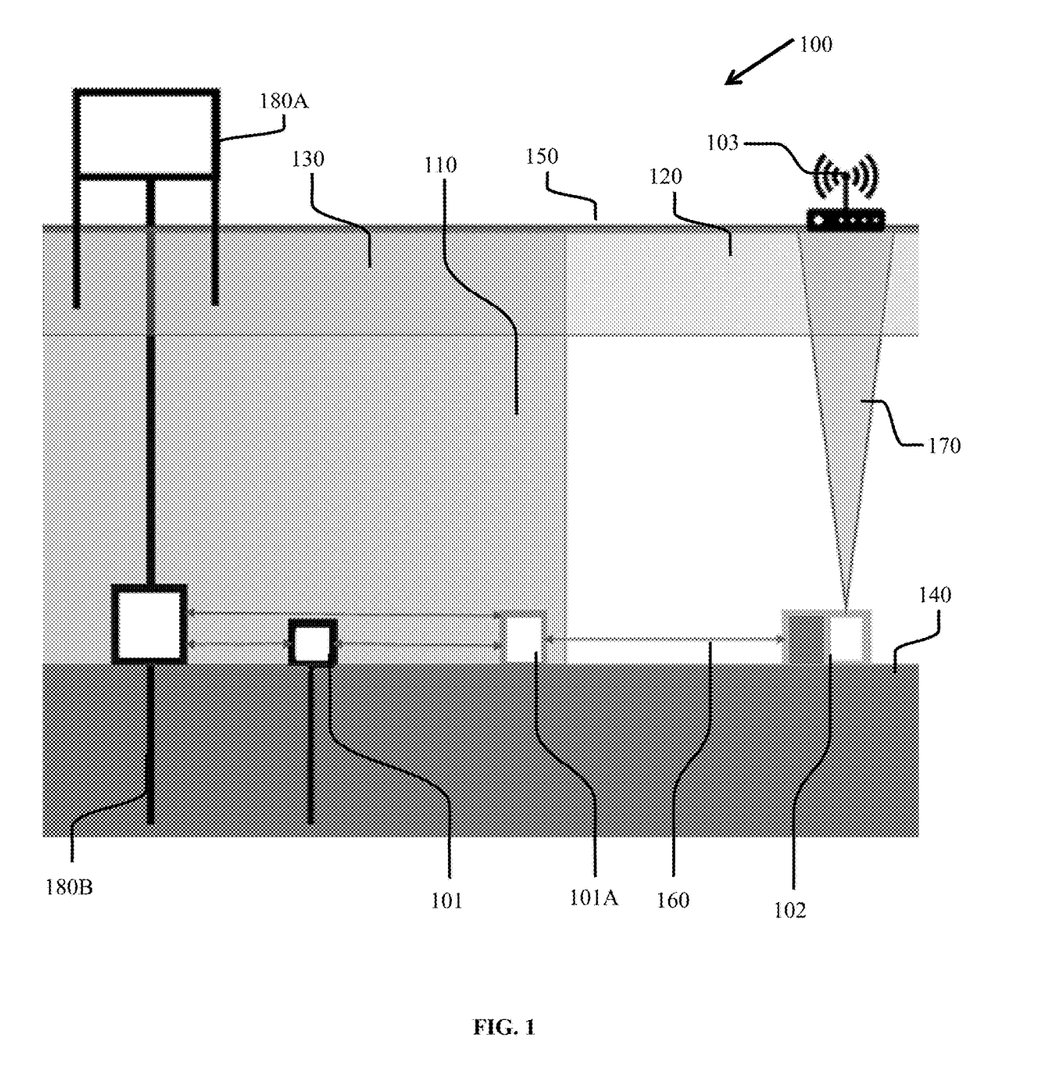
FIG. 1 is an illustration of a first exemplary hybrid optical/acoustic wireless communications platform for an aquatic environment.
Figure 2:
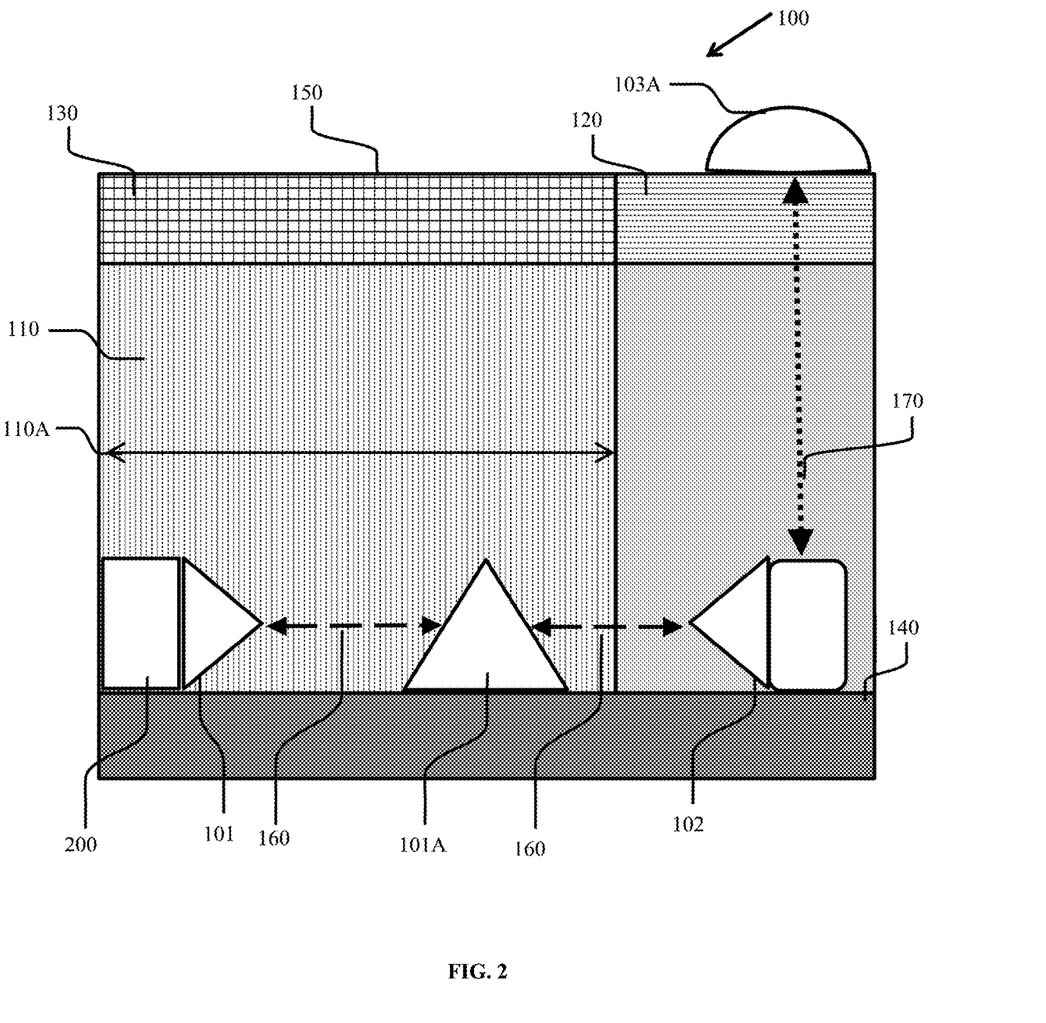
FIG. 2 is an illustration of a second exemplary hybrid optical/acoustic wireless communications platform for an aquatic environment.

One aspect provided per FIGS. 1-2 is a hybrid optical/acoustic wireless communications platform 100 for an aquatic environment. As shown, the platform 100 comprises an optical communications system 101, an optical/acoustic communications signal converter 102, and an acoustic communications system 103.

Aquatic Environment

In some embodiments, the aquatic environment is a marine environment. In some embodiments, the aquatic environment has a bed 140. In some embodiments, the bed 140 is a deep seabed. As shown in FIGS. 1 and 2, the aquatic environment comprises an optical noise zone 120 extending from a surface 150 of the aquatic environment to an optical noise depth throughout the aquatic environment. In some embodiments, the surface 150 of the aquatic environment is a surface between the atmosphere and the water of the aquatic environment. In some embodiments, the optical noise zone 120 is generated at least in part by ambient light and debris in the water. The aquatic environment further comprises an acoustic noise zone 110 extending vertically from the surface 150 of the aquatic environment to a bed 140 of the aquatic environment and horizontally to an acoustic noise distance 110A into the aquatic environment. At deep aquatic environments, less optical noise is generally observed due to the reduction of ambient light and biomass. Further the aquatic environment comprises an optical and acoustic noise zone 130 that is within both the optical noise zone 120 and the acoustic noise zone 110.

Per FIG. 1, aquatic construction and production implement surface machinery 180A at the surface 150 of the aquatic environment and bed machinery 180B at the bed 140 of the aquatic environment. In some embodiments, aquatic construction and production comprises one or more of the surface machinery 180A or the bed machinery 180B. In one example, the surface machinery 180A is an oil and gas production platform. In another example, the bed machinery 180B is a drill. In some embodiments, the acoustic noise distance 110A depends on the intensity of the noise emitted by the aquatic machinery 180A 180B, a salinity of the water, a density of the water, a tide in the water, or any combination thereof. In some embodiments, the acoustic noise distance 110A is about 150 m, 300 m, 450 m, 600 m, 750 m, 900 m, 1,050 m, 1,200 m, 1,500 m, 1,700 m, 1,900 m, or more, including increments therein.

In some embodiments, per FIG. 2, aquatic construction and production further implement sensors 200 distributed on the bed 140 of the aquatic environment. In some cases, the sensors 200 are installed after the construction of the aquatic machinery 180A 180B.

In some embodiments, the acoustic noise zone 110 is generated at least in part by the operation of machinery 180A 180B within the aquatic environment. As shown, the acoustic noise zone 110 extends horizontally to an acoustic noise distance 110A from a machinery 180A 180B in the aquatic environment. In some embodiments, the acoustic noise zone 110 extends radially to the acoustic noise distance 110A from the machinery 180A 180B in the aquatic environment.

Optical Communications System

Per FIGS. 1 and 2, the optical communications system 101 is configured to send and receive optical communications signals 160 along a bed 140 of the aquatic environment. In some embodiments, the optical communications system 101 is configured to send the optical communications signals 160 from within the acoustic noise zone 110. In some embodiments, the optical communications system 101 is configured to transmit the optical communications signals 160 to beyond an acoustic noise distance 110A. In some embodiments, the optical communications system 101 is configured to receive optical communications signals 160 from beyond the acoustic noise distance 110A. In some embodiments, the optical communications system 101 is configured to transmit the optical communications signals 160 to within the acoustic noise zone 110.

In some embodiments, the optical communications system 101 is configured to transmit the optical communications signals 160 directly through water. In some embodiments, the optical communications system 101 is configured to receive optical communications signals 160 directly through water. In some embodiments, the optical communications system 101 is configured to transmit the optical communications signals 160 directly through water. In some embodiments, the optical communications signals 160 comprise laser.

Per FIG. 2, aquatic construction and production implement sensors 200 distributed on the bed 140 of the aquatic environment. In some cases, the sensors 200 are installed after the construction of the aquatic production assets. In some embodiments, the optical communications signal 160 sent by the optical communication system is based on a sensor 200 data received by the optical communications system 101 from the sensor. In some embodiments, the sensor 200 data is directly received from the sensor 200 via a wired connection. In some embodiments, the sensor 200 is a pitot tube, a vibration sensor, a gyroscope, a camera, a microphone, a pressure sensor, a magnetic sensor, a radiation sensor, a chemical sensor, or any combination thereof. In some embodiments, the optical communications signal 160 received by the optical communication system is based on an equipment instruction.

In some embodiments, the optical communications system 101 comprises one or more optical repeaters 101A. In some embodiments, the optical communications system 101 comprises 2, 3, 4, 5, 6, 7, 8, 9, 10, or more optical repeaters 101A. The optical repeaters 101A, in some embodiments, extend the transmission distance of the optical communications system 101. Such increased transmission distance allows the circumvention of larger acoustic noise fields. In some embodiments, the one or more optical repeaters 101A are separated from each other by about 100 m to about 600 m. In some embodiments, the optical repeater has a range of about 100 m to about 600 m. In some embodiments, the optical communications system 101 sends and receives optical communications signals 160 along the bed 140 of the aquatic environment over a distance of about 0.5 km to about 6 km. In some embodiments, the optical communications signals 160 have a transmission rate of about 0.1 Mbps to about 2 Mbps.

In some embodiments, the optical communications system 101 comprises an energy storage device. In some embodiments, the energy storage device is capable of powering the optical communications system 101 for a period of time of about 1 year to about 5 years.

Optical/Acoustic Communications Signal Converter

In some embodiments, the optical/acoustic communications signal converter 102 is positioned at the bed 140 of the aquatic environment. In some embodiments, the optical/acoustic communications signal converter 102 is configured to receive optical communications signals 160 from the optical communications system 101 and transmit corresponding acoustic communications signals 170 to the acoustic communications system 103. In some embodiments, the optical/acoustic communications signal converter 102 is configured to receive acoustic communications signals 170 from the acoustic communications system 103 and transmit corresponding optical communications signals 160 to the optical communications system 101. In some embodiments, the optical/acoustic communications signal converter 102 receives optical communications signals 160 at a first data rate and transmits communications signals at a second data rate that is less than the first data rate. In some embodiments, the optical/acoustic communications signal converter 102 receives optical communications signals 160 at a first data rate and transmits communications signals at a second data rate that is greater than the first data rate. In some embodiments, the optical/acoustic communications signal converter 102 receives optical communications signals 160 at a first data rate and transmits communications signals at a second data rate that is about equal to the first data rate.

In some embodiments, the optical/acoustic communications signal converter 102 comprises an energy storage device. In some embodiments, the energy storage device is capable of powering the optical/acoustic communications signal converter 102 for a period of time of about 1 year to about 5 years.

Acoustic Communications System

In some embodiments, the acoustic communications system 103 is configured to send and receive acoustic communications signals 170 between the bed 140 of the aquatic environment and a surface 150 of the aquatic environment. In some embodiments, the acoustic communications system 103 is configured to send acoustic communications signals 170 from within the optical noise zone 120. In some embodiments, the acoustic communications system 103 is configured to transmit the acoustic communications signals 170 to beyond the optical noise depth. In some embodiments, the acoustic communications system 103 is configured to receive acoustic communications signals 170 from beyond the optical noise zone. In some embodiments, the acoustic communications system 103 is configured to transmit the acoustic communications signals 170 to within the optical noise zone 120.

In some embodiments, the acoustic communications system 103 comprises a buoy at the surface 150 of the aquatic environment, a vehicle at the surface 150 of the aquatic environment, or both. In some embodiments, the vehicle is an unmanned vehicle. In some embodiments, the unmanned vehicle is unmoored, untethered, or both. In some embodiments, the vehicle at the surface 150 of the aquatic environment transmits/receives a surface signal. In some embodiments, the acoustic communications signals 170 have a frequency of about 1 KHz to about 50 KHz. In some embodiments, the acoustic communications signals 170 have a transmission rate of about 15 Kbps to about 1 Gbps. In some embodiments, the acoustic communications system 103 sends and receives acoustic communications signals 170 between the bed 140 of the aquatic environment and a surface 150 of the aquatic environment over a distance of about 1 km to about 12 km.

In some embodiments, the acoustic communications system 103 comprises an energy storage device. In some embodiments, the energy storage device is capable of powering the acoustic communications system 103 for a period of time of about 1 year to about 5 years.

Terms and Definitions

Unless otherwise defined, all technical terms used herein have the same meaning as commonly understood by one of ordinary skill in the art to which this disclosure belongs.

As used herein, the singular forms "a," "an," and "the" include plural references unless the context clearly dictates otherwise. Any reference to "or" herein is intended to encompass "and/or" unless otherwise stated.

As used herein, the term "about" in some cases refers to an amount that is approximately the stated amount.

As used herein, the term "about" refers to an amount that is near the stated amount by 10%, 5%, or 1%, including increments therein.

As used herein, the term "about" in reference to a percentage refers to an amount that is greater or less the stated percentage by 10%, 5%, or 1%, including increments therein.

As used herein, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B, and C together.

EXAMPLES

The following illustrative examples are representative of embodiments of the software applications, systems, and methods described herein and are not meant to be limiting in any way.

Example 1—Sensor Communication

In one example herein, a seismometer sensor on the bed of the aquatic environment records vibrations at a data rate of 1 Gbps and transmits the vibration data to the optical communications system through a wired connection. The optical communications system then sends optical communications signals along a bed of the aquatic environment at a data rate of 1 Mbps based on the vibration data. The optical/acoustic communications signal converter then receives and converts the optical communication signal to an acoustic signal and instructs the acoustic communications system to transmit the acoustic signal to a buoy on the surface of the aquatic environment.

Example 2—Production Asset Instruction

In one example herein, an unmanned vehicle on the surface of the aquatic environment transmits an acoustic signal containing a pump pressure to the acoustic communications system. The optical/acoustic communications signal converter then converts the acoustic signal to an optical signal, whereas the optical communication system receives the optical signal and transmits the pump pressure to a pump on the bed of the aquatic environment.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure.

What is claimed is:

1. A hybrid optical/acoustic wireless communications platform for an aquatic environment, the platform comprising:
    (a) an optical communications system configured to send and receive optical communications signals along a bed of the aquatic environment;
    (b) an optical/acoustic communications signal converter; and
    (c) an acoustic communications system configured to send and receive acoustic communications signals between the bed of the aquatic environment and a surface of the aquatic environment;
        wherein the optical/acoustic communications signal converter is positioned at the bed of the aquatic environment.

2. The hybrid optical/acoustic wireless communications platform of claim 1, wherein the aquatic environment is a marine environment.

3. The hybrid optical/acoustic wireless communications platform of claim 2, wherein the bed of the marine environment is a deep seabed.

4. The hybrid optical/acoustic wireless communications platform of claim 1, wherein the optical communications signals comprise laser.

5. The hybrid optical/acoustic wireless communications platform of claim 1, wherein the acoustic communications system comprises a buoy at the surface of the aquatic environment.

6. The hybrid optical/acoustic wireless communications platform of claim 1, wherein the acoustic communications system comprises a vehicle at the surface of the aquatic environment.

7. The hybrid optical/acoustic wireless communications platform of claim 6, wherein the vehicle is an unmanned vehicle.

8. The hybrid optical/acoustic wireless communications platform of claim 7, wherein the unmanned vehicle is unmoored and untethered.

9. The hybrid optical/acoustic wireless communications platform of claim 6, wherein the vehicle at the surface of the aquatic environment transmits/receives a surface signal.

10. The hybrid optical/acoustic wireless communications platform of claim 1, wherein the optical/acoustic communications signal converter is configured to: a) receive optical communications signals from the optical communications system and transmit corresponding acoustic communications signals to the acoustic communications system; and b) receive acoustic communications signals from the acoustic communications system and transmit corresponding optical communications signals to the optical communications system.

11. The hybrid optical/acoustic wireless communications platform of claim 10, wherein the optical/acoustic communications signal converter receives communications signals at a first data rate and transmits communications signals at a second data rate that is less than the first data rate.

12. The hybrid optical/acoustic wireless communications platform of claim 1, wherein the optical communications system comprises one or more optical repeaters.

13. The hybrid optical/acoustic wireless communications platform of claim 12, comprising two or more optical repeaters, wherein the two or more optical repeaters are separated by about 100 m to 600 m.

14. The hybrid optical/acoustic wireless communications platform of claim 12, wherein the one or more optical repeaters has a range of about 100 m to about 600 m.

15. The hybrid optical/acoustic wireless communications platform of claim 1, wherein the acoustic communications signals have a frequency of about 1 KHz to about 50 KHz.

16. The hybrid optical/acoustic wireless communications platform of claim 1, wherein the acoustic communications signals have a transmission rate of about 15 Kbps to about 1 Gbps.

17. The hybrid optical/acoustic wireless communications platform of claim 1, wherein the optical communications signals have a transmission rate of about 0.1 Mbps to about 2 Mbps.

18. The hybrid optical/acoustic wireless communications platform of claim 1, wherein the optical communications system sends and receives optical communications signals along the bed of the aquatic environment over a distance of about 0.5 km to about 6 km.

19. The hybrid optical/acoustic wireless communications platform of claim 1, wherein the acoustic communications system sends and receives acoustic communications signals between the bed of the aquatic environment and a surface of the aquatic environment over a distance of about 1 km to about 12 km.

20. A hybrid optical/acoustic wireless communications platform for an aquatic environment,
    the aquatic environment comprising:

a) an optical noise zone extending from a surface of the aquatic environment to an optical noise depth throughout the aquatic environment; and
b) an acoustic noise zone extending from the surface of the aquatic environment to a bed of the aquatic environment out to an acoustic noise distance into the aquatic environment;

the platform comprising:
a) an optical communications system configured to: send optical communications signals from within the acoustic noise zone and transmit the optical communications signals to beyond the acoustic noise distance; and receive optical communications signals from beyond the acoustic noise distance and transmit the optical communications signals to within the acoustic noise zone;
b) an optical/acoustic communications signal converter; and
c) an acoustic communications system configured to: send acoustic communications signals from within the optical noise zone and transmit the acoustic communications signals to beyond the optical noise depth; and receive acoustic communications signals from beyond the optical noise distance and transmit the acoustic communications signals to within the optical noise zone.

21. The hybrid optical/acoustic wireless communications platform of claim 20, wherein the aquatic environment is a marine environment.

22. The hybrid optical/acoustic wireless communications platform of claim 21, wherein the bed of the marine environment is a deep seabed.

23. The hybrid optical/acoustic wireless communications platform of claim 20, wherein the optical communications signals comprise laser.

24. The hybrid optical/acoustic wireless communications platform of claim 20, wherein the acoustic communications system comprises a buoy at the surface of the aquatic environment.

25. The hybrid optical/acoustic wireless communications platform of claim 20, wherein the acoustic communications system comprises a vehicle at the surface of the aquatic environment.

26. The hybrid optical/acoustic wireless communications platform of claim 25, wherein the vehicle is an unmanned vehicle.

27. The hybrid optical/acoustic wireless communications platform of claim 26, wherein the unmanned vehicle is unmoored and untethered.

28. The hybrid optical/acoustic wireless communications platform of claim 25, wherein the vehicle at the surface of the aquatic environment transmits/receives a surface signal.

29. The hybrid optical/acoustic wireless communications platform of claim 20, wherein the optical/acoustic communications signal converter is positioned at the bed of the aquatic environment.

30. The hybrid optical/acoustic wireless communications platform of claim 20, wherein the optical/acoustic communications signal converter is configured to: a) receive optical communications signals from the optical communications system and transmit corresponding acoustic communications signals to the acoustic communications system; and b) receive acoustic communications signals from the acoustic communications system and transmit corresponding optical communications signals to the optical communications system.

31. The hybrid optical/acoustic wireless communications platform of claim 30, wherein the optical/acoustic communications signal converter receives communications signals at a first data rate and transmits communications signals at a second data rate that is less than the first data rate.

32. The hybrid optical/acoustic wireless communications platform of claim 20, wherein the optical communications system comprises one or more optical repeaters.

33. The hybrid optical/acoustic wireless communications platform of claim 32, wherein the one or more optical repeaters are separated from each other by about 100 m to about 600 m.

34. The hybrid optical/acoustic wireless communications platform of claim 32, wherein the one or more optical repeaters has a range of about 100 m to about 600 m.

35. The hybrid optical/acoustic wireless communications platform of claim 20, wherein the acoustic communications signals have a frequency of about 1 KHz to about 50 KHz.

36. The hybrid optical/acoustic wireless communications platform of claim 20, wherein the acoustic communications signals have a transmission rate of about 15 Kbps to about 1 Gbps.

37. The hybrid optical/acoustic wireless communications platform of claim 20, wherein the optical communications signals have a transmission rate of about 0.1 Mbps to about 2 Mbps.

38. The hybrid optical/acoustic wireless communications platform of claim 20, wherein the optical communications system sends and receives optical communications signals along the bed of the aquatic environment over a distance of about 0.5 km to about 6 km.

39. The hybrid optical/acoustic wireless communications platform of claim 20, wherein the acoustic communications system sends and receives acoustic communications signals between the bed of the aquatic environment and a surface of the aquatic environment over a distance of about 1 km to about 12 km.

40. The hybrid optical/acoustic wireless communications platform of claim 20, wherein the optical noise zone is generated at least in part by ambient light and debris in the water.

41. The hybrid optical/acoustic wireless communications platform of claim 20, wherein the acoustic noise zone is generated at least in part by the operation of machinery at the surface of the aquatic environment, on the bed of the aquatic environment, or both at the surface of and on the bed of the aquatic environment.

42. A method of conducting wireless communications in an aquatic environment,
wherein the aquatic environment comprises:
a) an optical noise zone extending from a surface of the aquatic environment to an optical noise depth throughout the aquatic environment; and
b) an acoustic noise zone extending from the surface of the aquatic environment to a bed of the aquatic environment out to an acoustic noise distance into the aquatic environment;
wherein the method comprises:
a) generating, at an optical communications system, optical communications signals from within the acoustic noise zone and transmitting the optical communications signals to beyond the acoustic noise distance;
b) receiving, at an optical/acoustic communications signal converter, optical communications signals from the optical communications system and transmitting corresponding acoustic communications signals; and c) receiving, by the acoustic communications system, acoustic communications signals from beyond the optical noise distance and transmitting the acoustic communications signals to within the optical noise zone.

43. A method of conducting wireless communications in an aquatic environment,
wherein the aquatic environment comprises:
a) an optical noise zone extending from a surface of the aquatic environment to an optical noise depth throughout the aquatic environment; and
b) an acoustic noise zone extending from the surface of the aquatic environment to a bed of the aquatic environment out to an acoustic noise distance into the aquatic environment;
wherein the method comprises:
a) generating, by an acoustic communications system, acoustic communications signals from within the optical noise zone and transmitting the acoustic communications signals to beyond the optical noise depth;
b) receiving, at an optical/acoustic communications signal converter, acoustic communications signals from the acoustic communications system and transmitting corresponding optical communications signals; and
c) receiving, at an optical communications system, optical communications signals from beyond the acoustic noise distance and transmitting the optical communications signals to within the acoustic noise zone.

* * * * *